United States Patent [19]

Slynko

[11] Patent Number: 5,803,776
[45] Date of Patent: Sep. 8, 1998

[54] PARTIALLY IMMERSIBLE PROPELLER

[76] Inventor: Petr Petrovich Slynko, 4 Michurina St., Apt.68, Kiev 252014, Ukraine

[21] Appl. No.: 896,161

[22] Filed: Jul. 17, 1997

Related U.S. Application Data

[63] Continuation of Ser. No. 578,673, Feb. 1, 1996, abandoned.

[30] Foreign Application Priority Data

Jul. 15, 1993 [UA] Ukraine ................................ 93005357

[51] Int. Cl.⁶ ..................................................... B63H 1/14
[52] U.S. Cl. .................................. 440/49; 440/50; 440/61
[58] Field of Search .................................. 440/48, 49, 50, 440/79, 90–93, 58–63

[56] References Cited

U.S. PATENT DOCUMENTS 2,162,058  6/1939  Brush .
2,501,617  3/1950  Roesch ........................................ 440/50
4,846,741  7/1989  Betsinger .................................... 440/61

FOREIGN PATENT DOCUMENTS 1578964  5/1985  U.S.S.R. .

*Primary Examiner*—Jesus D. Sotelo
*Attorney, Agent, or Firm*—Abelman, Frayne & Schwab

[57] ABSTRACT

The propeller comprises a propeller shaft mounted so that its position in relation to the ship's hull can be varied both at stopovers or in transit. The propeller shaft carries propeller blades of such a configuration that, while going into the water, they position their face sides normally to the longitudinal center plane of the ship. According to the invention the propeller blades can change position relatively to the longitudinal center plane or to the midship section plane or simultaneously to both the planes, thereby increasing speed, maneuverability, efficiency, and safety.

7 Claims, 9 Drawing Sheets

PARTIALLY IMMERSIBLE PROPELLER

This is a continuation of application Ser. No. 08/578,673 filed on Feb. 1, 1996, now abandoned.

TECHNICAL FIELD

The present invention generally relates to partially immersed propellers, and more particularly to propellers mounted movably relative to the ship body.

BACKGROUND ART

Known in the art is a partially immersed propeller (SU, A No. 535186), comprising shipborne spiral blades with helical crown portions mounted on an axle positioned at about 45° to the longitudinal ship axis in the horizontal plane.

However, such propeller does not provide for high propulsion speeds, efficiency and maneuverability of the ship.

Also known in the art is a partially immersed propeller (UA, A, 1831), comprising a propeller shaft disposed in an angular relationship to the longitudinal center plane of a ship and propeller blades mounted on the propeller shaft.

With a view to increasing the towrope force, the prior-art propeller comprises at least two propeller screws on propeller shafts positioned at an angle of $45<\alpha<70°$ to the longitudinal center plane of the ship and having propeller blades of such a configuration that, while rotating on the shafts, they position their face sides normally to the longitudinal center plane of the ship as their face sides are being submerged, i.e. the face side of each blade is imparting an axial motion to the water and is sustaining a reactive thrust.

However, such propeller is of low economic merits and its propulsion characteristics are limited.

DISCLOSURE OF INVENTION

The invention is based on the problem of providing a partially immersed propeller wherein propulsion characteristics would be enhanced by changing the propeller mechanical linkage with the ship's body.

The problem has been resolved in a partially immersed propeller comprising a propeller shaft disposed in an angular relationship to the longitudinal center plane of a ship and partially immersed propeller blades mounted on the propeller shaft and constructed so that, being immersed in the water, the face side thereof is positioned substantially normally to the longitudinal center plane of the ship in which according to the invention the propeller blades are mounted for varying their position relative to the longitudinal center plane and/or to the midship section plane.

Such connection of the propeller blades and the propeller shaft provides for enhancing propulsion characteristics of the propeller, namely, the speed of advance, maneuvering as well as safety in emergency, and economy.

In the propeller of the invention, the propeller blades can be positioned any way due to a combination of positions of the propeller shaft at various angles in respect of the longitudinal center plane and the molded base plane of the ship as well as various positions of the blades which can be simultaneously moved with respect to said planes. As is well known in the naval architecture art, the molded base plane is the plane parallel to the free water level and passing at the top of the keel (i.e., midship) in the designed position of flotation. This plane is one of the reference planes which intersects the longitudinal center plane. The three reference planes are the base plane, the longitudinal center plane, and the midship section plane, i.e., the molded base plane. For example, in the line drawing of a ship, i.e. the set of lines of intersection of the hull molded surface with the planes parallel to the aforementioned three data planes, the body of the ship is defined by body lines or molded lines. The word "molded" in the art of naval architecture means "determined by, or cut to specifications prepared in a mold loft". Often, "molded" is used to refer to parts of a ship.

The propeller blades can be mounted on the propeller shaft for adjustment within ±30° relative to the perpendicular to the propeller shaft axis, they also can be mounted for rotation about their axes which can be positioned within ±30° relatively to the perpendicular to the propeller shaft axis in its initial position.

It is, sometimes, practical to change the position of the propeller blades by changing the position of the propeller shaft in respect of the longitudinal center plane of the ship through an angle of 0° to 90°.

Spacing of the propeller blades can be varied by mounting them on the propeller shaft adapted for movement in respect of the molded base plane through an angle of 0° to 30°.

One embodiment of the invention can advantageously comprise the propeller blades mounted on the propeller shaft which is rotatable about an axis that is perpendicular to the molded base plane.

Due to the three degrees of freedom, the propeller shaft of the novel propeller and the propeller blades mounted thereon can be positioned (on the after body and/or fore body of the ship at any draught, speed of advance, various maneuvers, etc.) the most effective use of the repulsive force of water for movement ahead, sideways or astern without changing the sense and velocity of rotation of the propeller shaft in an emergency. By "sense" is meant one of two opposite directions of rotation of the propeller, i.e., clockwise or counterclockwise.

Compared with the prior art propeller, higher efficiency, speed, safety, and maneuverability are provided in a ship or other vessel, e.g. a self-propelled airdrome, offshore platform, etc. These characteristics are felt to the outmost in the airlift ships of such a design where bow and/or aft propeller shafts can be positioned within a range of 0° to 90° to the longitudinal center plane of the ship.

BEST MODE FOR CARRYING OUT THE INVENTION

Figure 1:
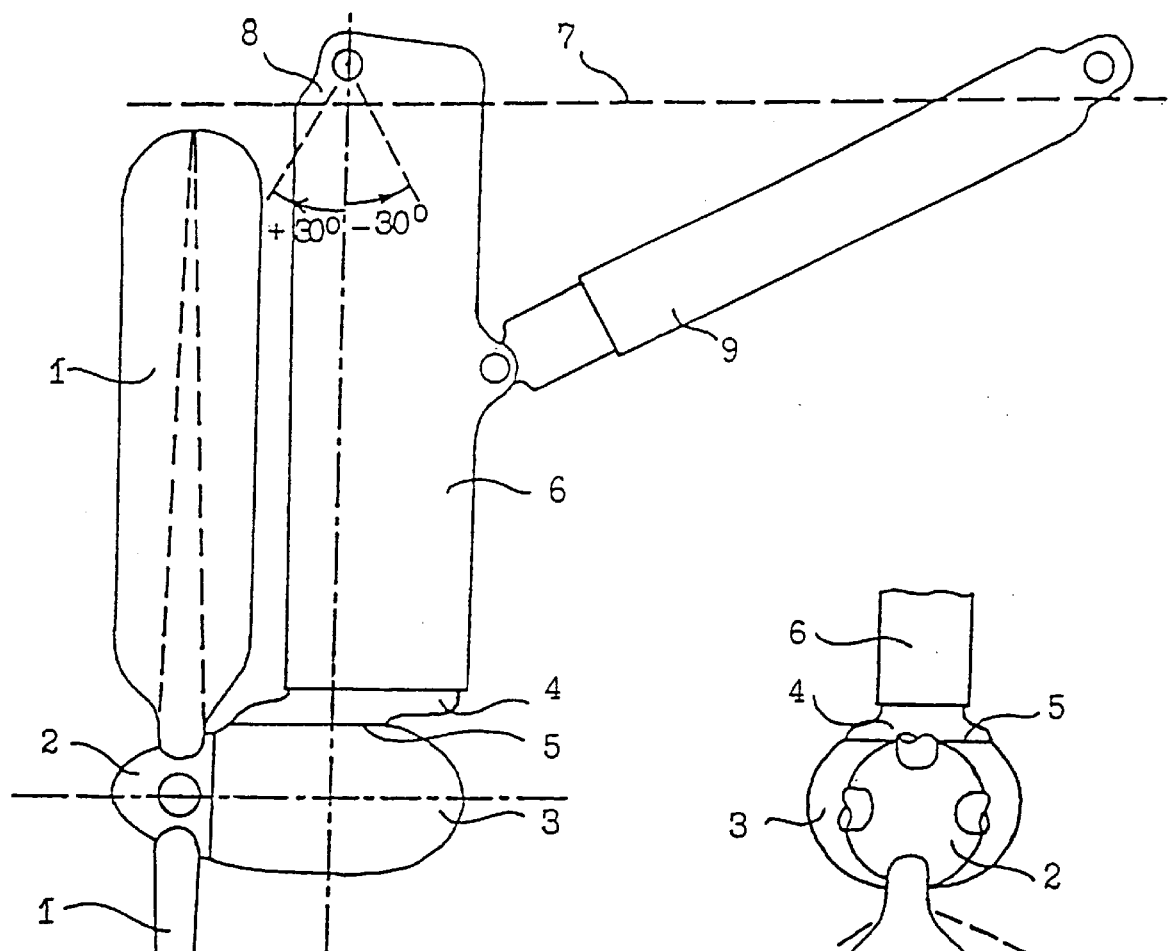
FIG. 1 is a four-blade varying-position partially immersed propeller (side view)

A varying-position 4-blade propeller of the invention for use aboard the ships designed to be supported by the dynamic action of the water or the air comprises (FIG. 1) rotatable propeller blades 1 mounted on the streamlined hub 2 of a propeller shaft arranged, together with a reduction-gear unit and a mechanism for a rotary adjustment of the blades, in a casing 3. The casing 3, by its upper portion, and a hollow telescopic support 4 are rotatably interconnected for rotation of the casing 3 both ways along the line 5 in the range of 0° to 90°. The telescopic support 4 is arranged in a housing 6 which, by its upper portion, is pivoted to a ship's hull 7 by lugs 8, while at its middle portion it is pivoted to a mechanism 9 for tilting the housing 6. Ships of various types can be equipped with propeller blades that vary in construction and shape.

Figure 2:
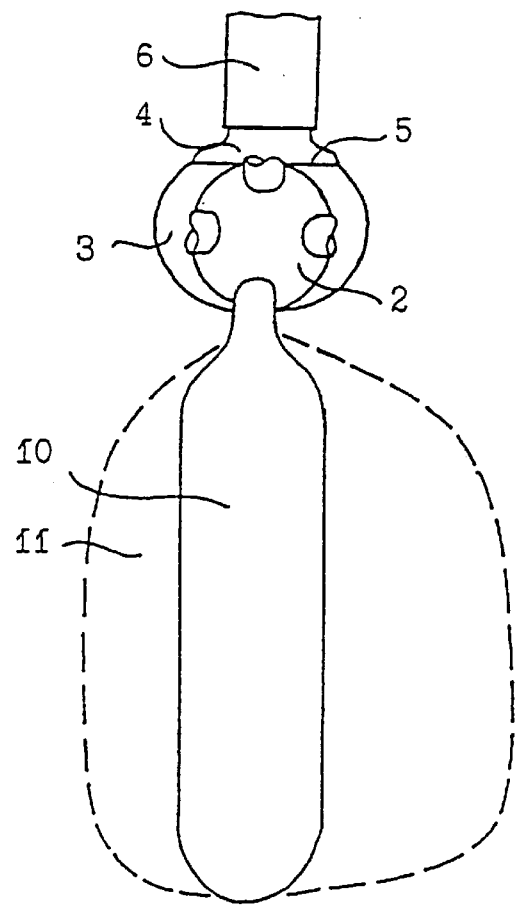
FIG. 2 is a front view of the partially immersed propeller of FIG. 1.

The blades may at times be of an airfoil type such as a blade 10 (FIG. 2) and at other times of a conventional screw propeller type such as a blade 11 (shown in dotted lines in FIG. 2).

Figure 3:
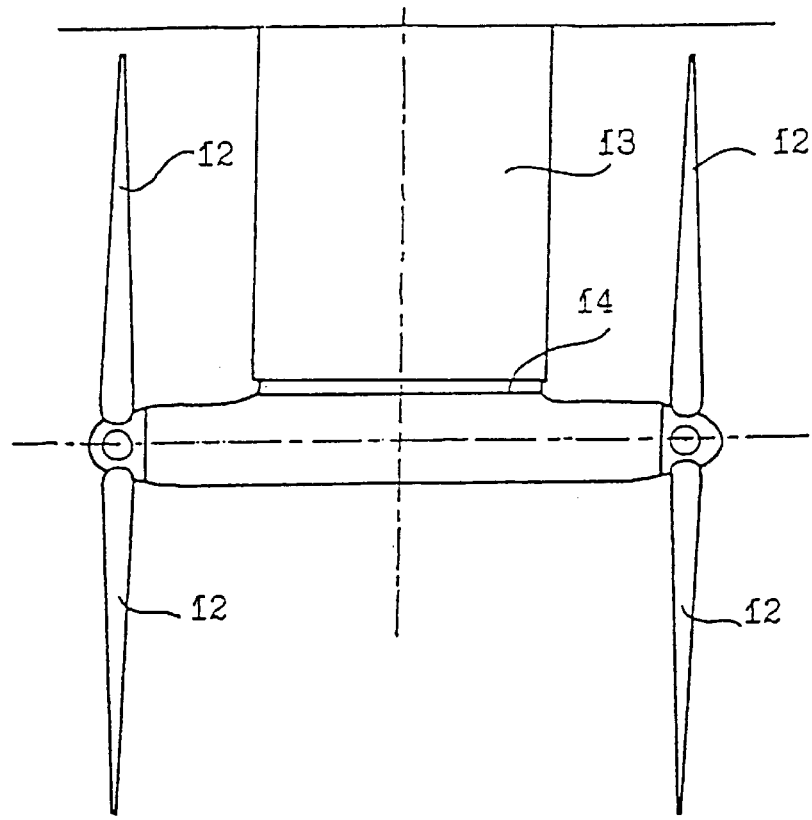
FIG. 3 is a four-blade two-position partially immersed propeller (side view)
Figure 4:
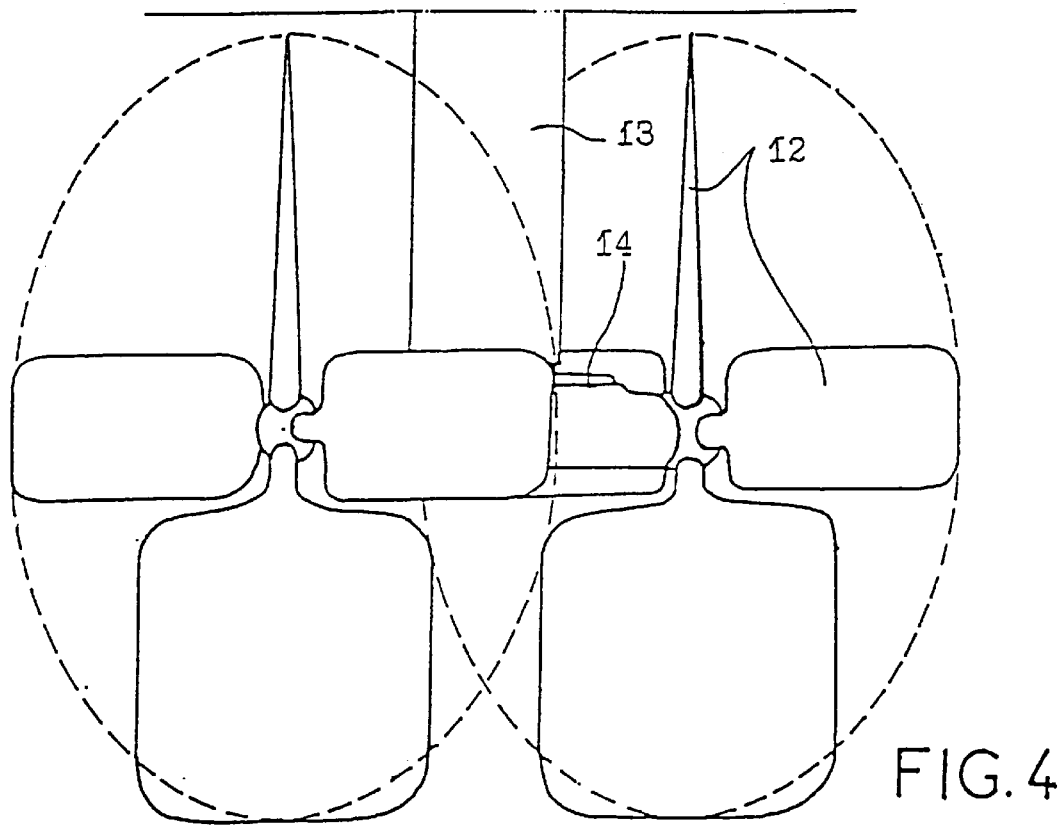
FIG. 4 is a four-blade two-position partially immersed propeller (front view)

On large-capacity air-cushion vehicles, there can be used two- or more-position propellers (FIGS. 3 and 4) having two or more sets of propeller blades 12 spaced on a propeller shaft. By means of any mechanism, such as a telescopic support 13, the propeller blades 12 may be submerged in the water to any depth and rotatably adjusted along the line 14.

Figure 5:
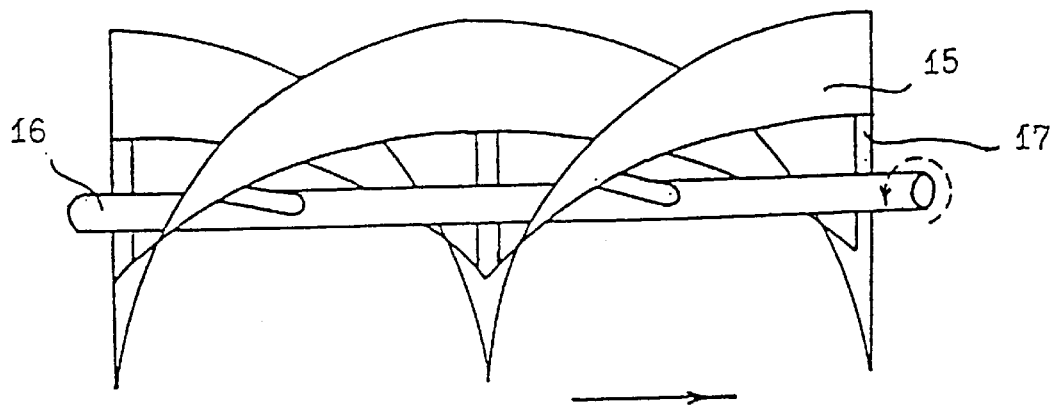
FIG. 5 is a two-blade varying-position partially immersed propeller of a band-shaped type (side view)
Figure 6:
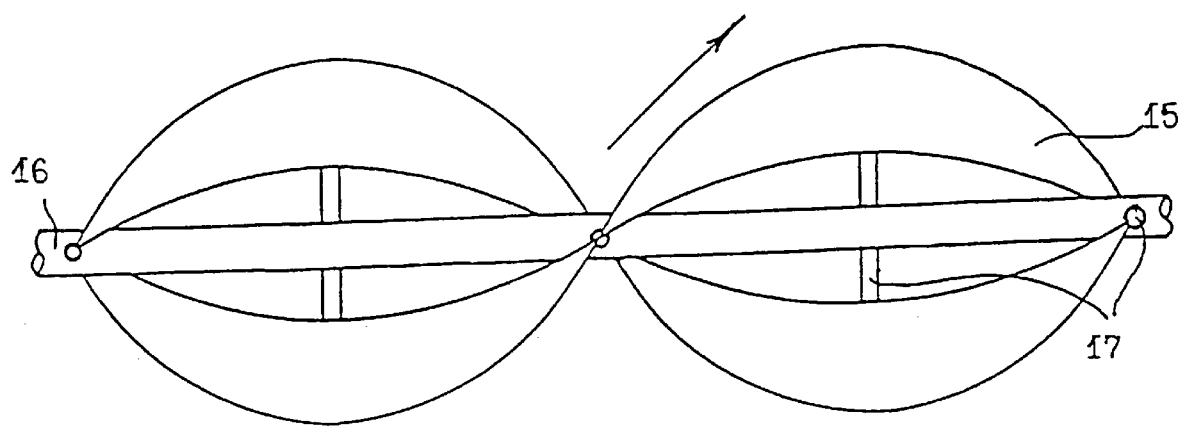
FIG. 6 is a two-blade band-shaped propeller (top view)

A varying-position 2- or more-blade propeller (FIGS. 5 and 6) may have the shape of a band 15, as if several blades are interconnected side by side, spaced on a propeller shaft 16 by rods 17.

Figure 7:
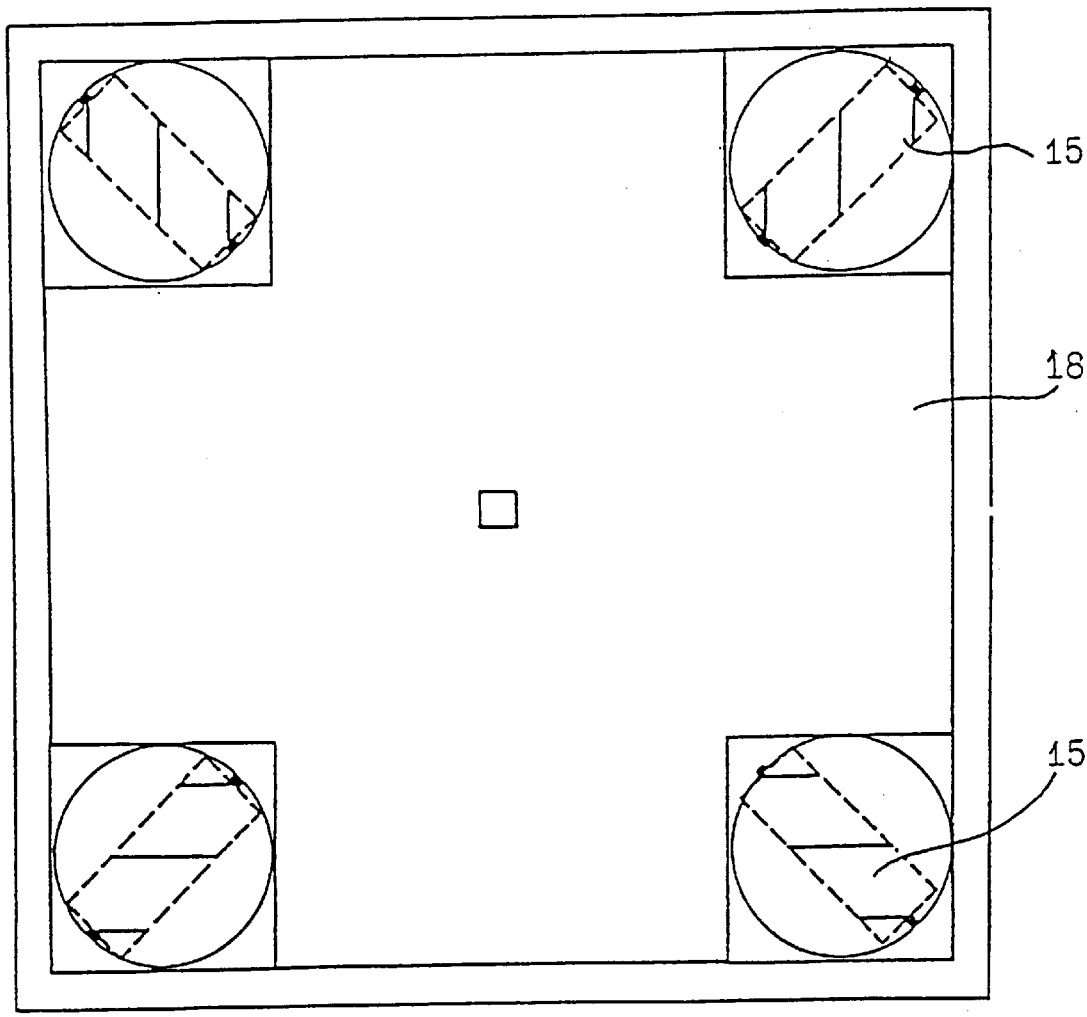
FIG. 7 is an arrangement of four-blade band-shaped propellers at the corners of a self-propelled offshore platform (bottom view)
Figure 8:
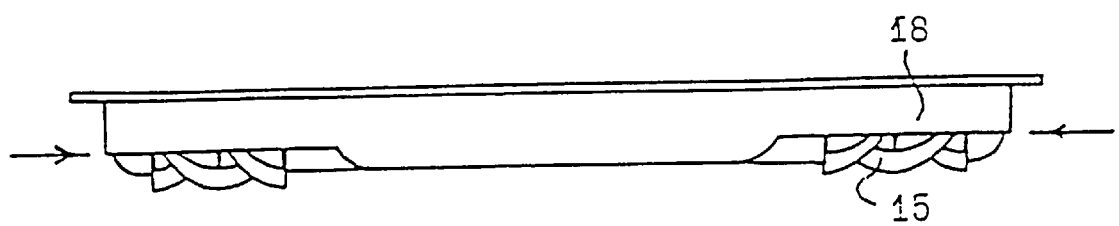
FIG. 8 is a side view of the platform of FIG. 7.

The varying-position propellers (FIGS. 7 and 8) can be provided on offshore platforms 18.

They can be used on all-weather self-propelled aerodromes, pontoon works, superpower tugs, floating power plants, etc.

Figure 9:
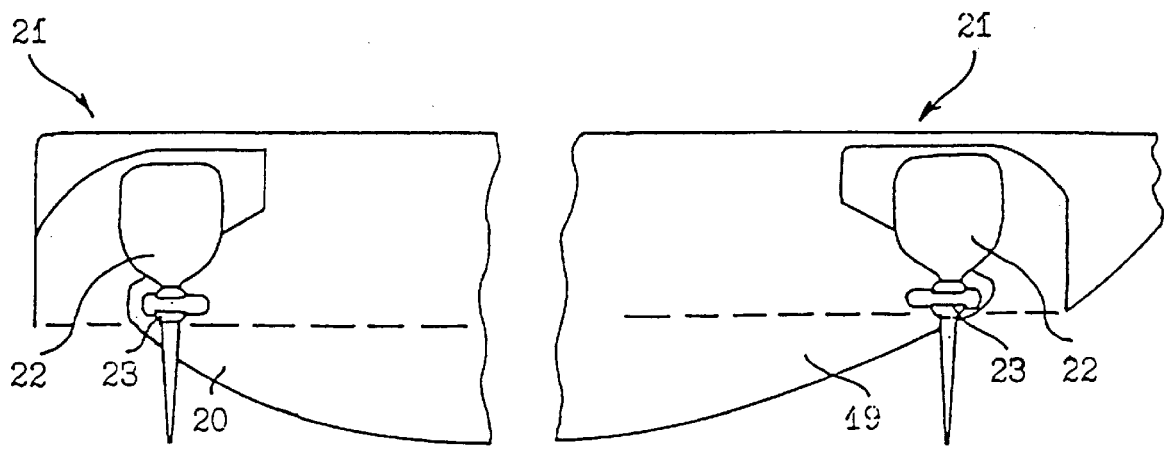
FIG. 9 is a side view of the bow and stern of a displacement vessel provided with four two-blade varying-position propellers having rotatable and inclinable blades.
Figure 10:
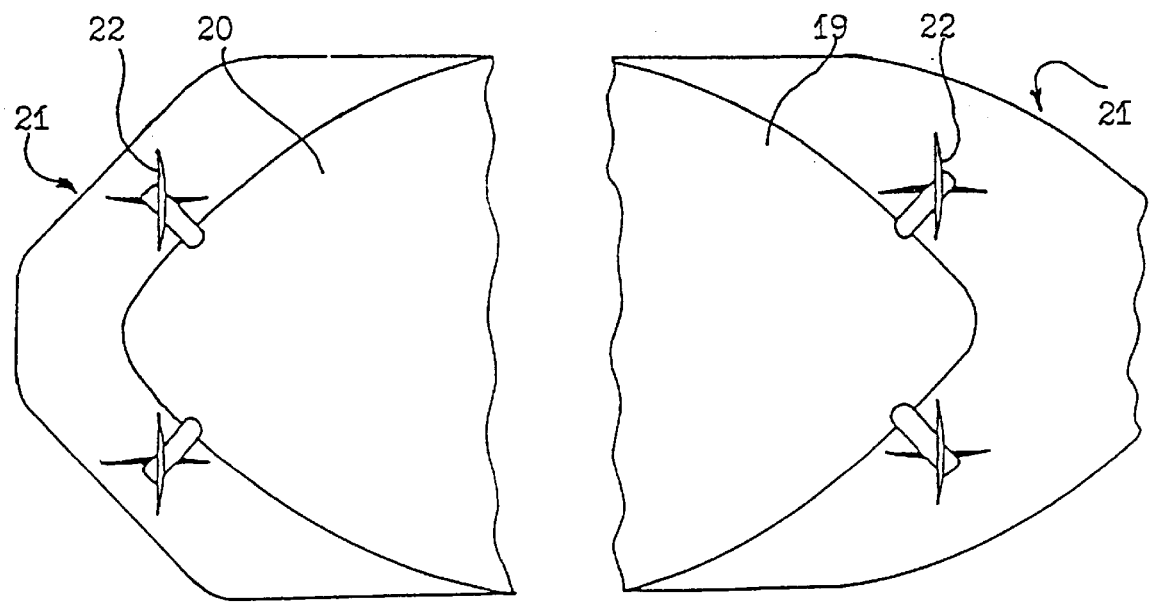
FIG. 10 is bottom a view of the displacement vessel of FIG. 9.

FIGS. 9 and 10 show the bow 19 and the stern 20 of a displacement vessel 21 which is equipped with four single-position two-blade propellers 2 having blades 22 that can be rotated and adjusted by means of conventional mechanisms 23 for rotating and adjusting thereof.

Such propeller arrangement can be used on supertankers, trawlers, etc.

Figure 11:
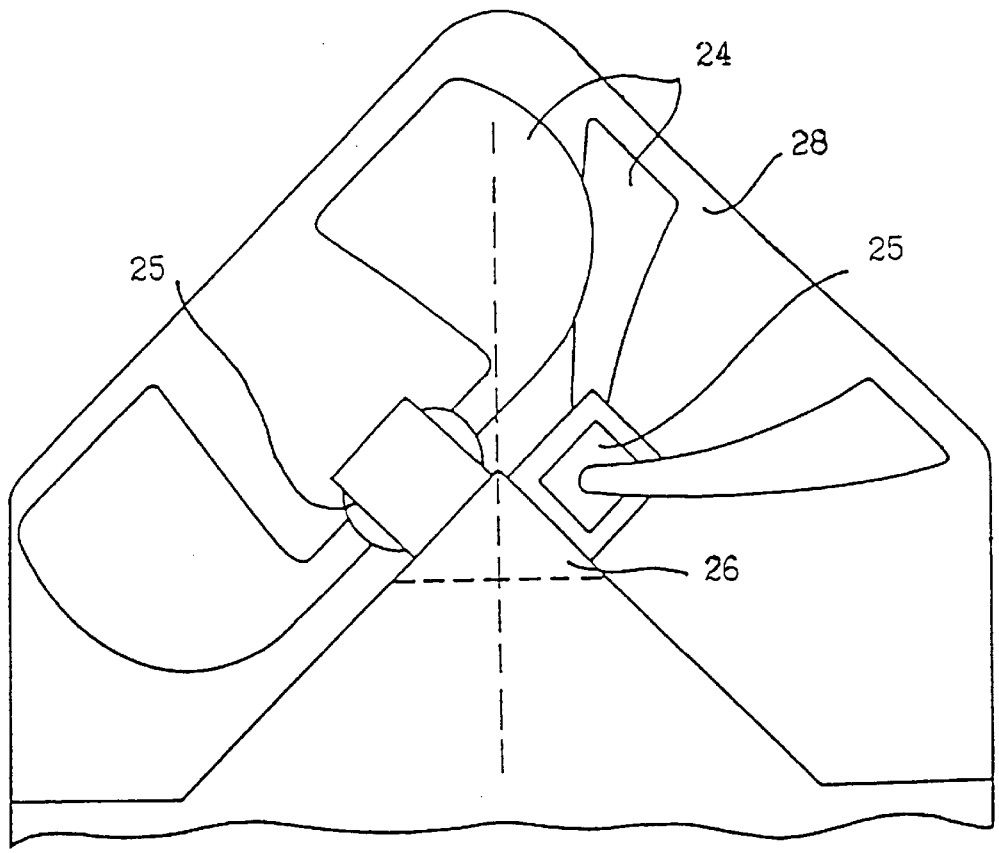
FIG. 11 is an arrangement of two acinaciform two-blade varying-position propellers at the stern of a hydrofoil ship (bottom view)
Figure 12:
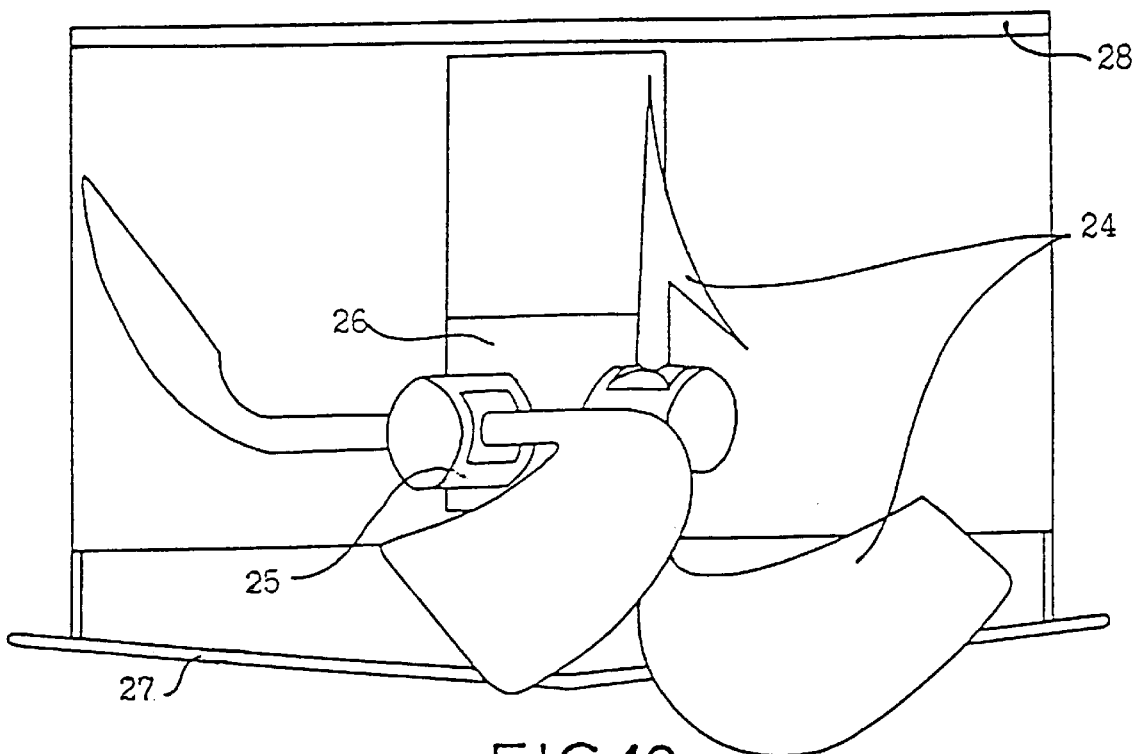
FIG. 12 is a stern view of the ship of FIG. 11.

On ships having hulls of a small width, e.g. hydrofoil boats, there can be used two coaxial and simultaneously and oppositely rotating propellers of FIG. 11 (bottom view) and FIG. 12 (back view) having acinaciform blades 24, a mechanism 25 for rotating and adjusting the blades 24, a mechanism 26 for raising and lowering the propellers which is useful in providing the optimal position of the blades 24 in water when the boat is lifted out of the water by hydrofoils 27. A safety apron plate 28 is provided above the propellers.

Figure 13:
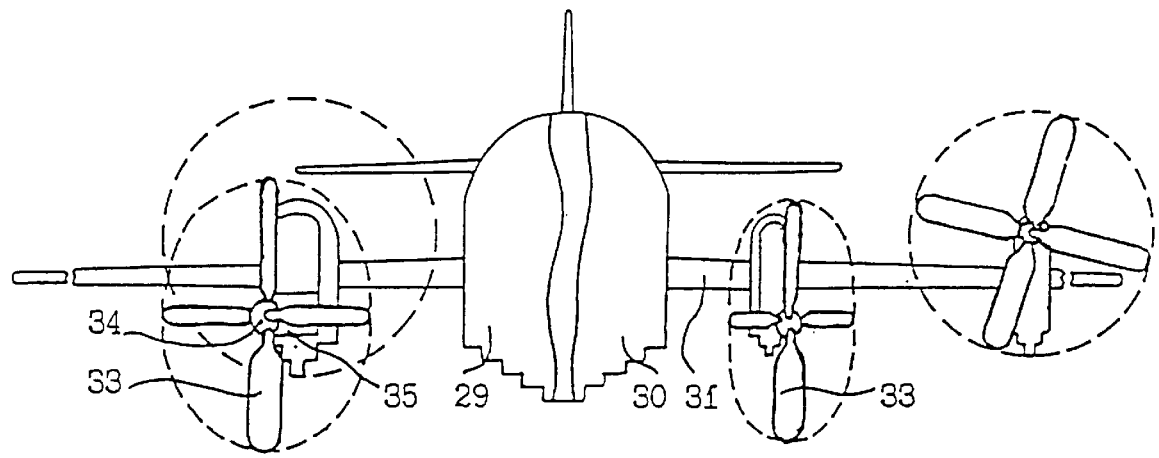
FIG. 13 is a front view of the left and the right portions of 4-engine and 2-engine convertiplanes respectively, having two varying in size four-blade varying-position propellers.
Figure 14:
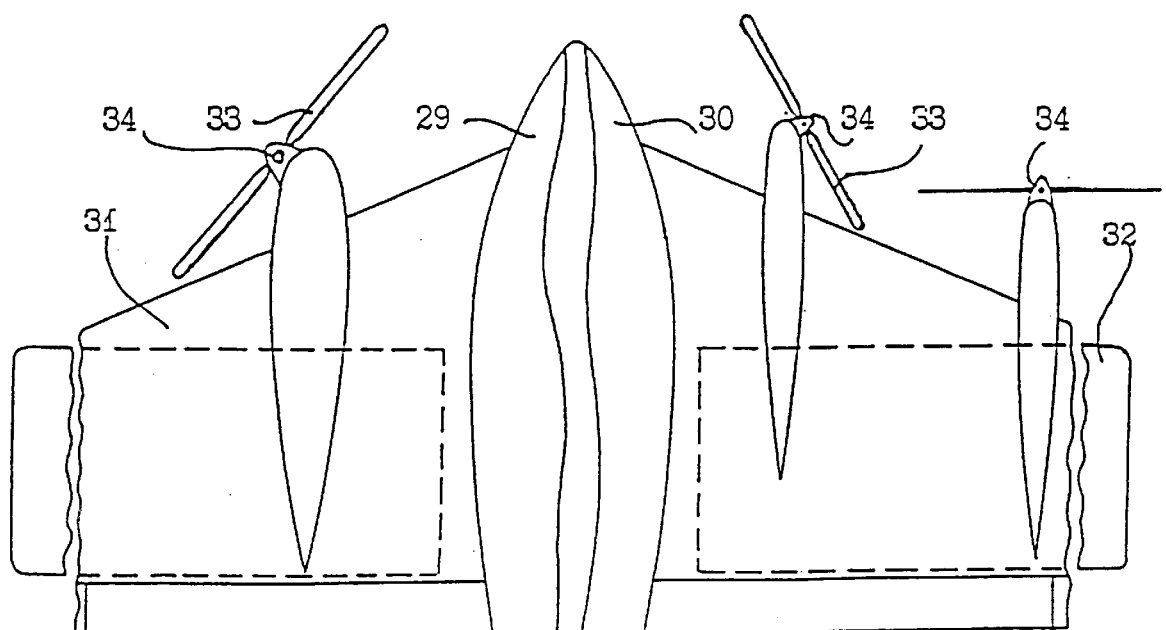
FIG. 14 is a bottom view of the convertiplanes shown in FIG. 13 showing various arrangements of the propellers.

The propellers of the invention may be of an airfoil type (FIG. 13, front view) and (FIG. 14, bottom view).

Such propellers can be used on convertiplanes such as twin-motor structures 29, four-motor structures 30, and multi-motor structures, all having conventional wings 31 and retractable wings 32.

In such propellers, propeller blades 33 are mounted on rotatable hubs 34 of a propeller shaft, which hubs can be adjusted by a mechanism 35 for raising and lowering the same to a suitable position for the convertiplane to start, glide, travel on the air-cushion support, or take off.

The towrope force exerted by a propeller blade moving in water depends on the inclination angle of the direction of blade motion from the midship section plane.

Figure 15:
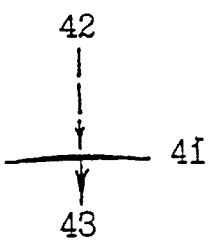
FIG. 15 is a projection of a horizontal section of a conventional paddle submerged in the water on a horizontal plane.

Considered separately, each propeller blade 41 (FIG. 15), while moving in the direction of a dotted arrow 42, is accelerating the masses of water in the direction and with a force as represented by an arrow 43.

Figure 16:
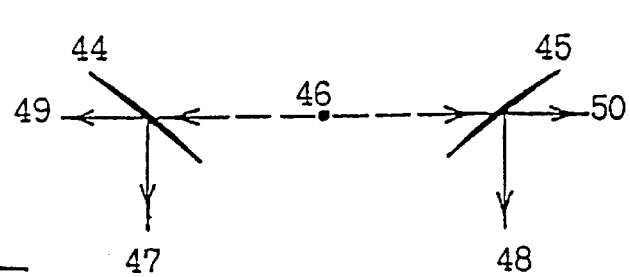
FIG. 16 is a diagrammatic view of two conventional screw vanes positioned at an angle to each other.

With the propeller rotating on its axis, the action of two propeller blades 44 and 45 (FIG. 16), which diverge from a common point 46 when in the water, is represented by solid arrows 47 and 48 showing the direction and the force of water acceleration (eventually it is an overall pull of the propeller), while arrows 49 and 50 show the direction and the force, apart from water acceleration, of whirling and throwing the water around, i.e. the force represented by the arrows 49 and 50 constitutes the losses due to throwing the water around and whirling, which are substantial in conventional screw propellers and are practically non-existant in the propellers of the invention.

As the direction of motion of the blades of the propeller according to the invention-in water is changed in the range of 0° to 90° (FIG. 17) to the midship section plane so changes the pull. When the blade changes position 51 to position 52 (in the midship section plane) there is no pull and it does not develop until the blade changes position 51 to angular positions 53 to 58. In one embodiment of the invention the pull was 37, 68, 91, 99, 81, and 55% of the maximum bollard pull at 15, 30, 45, 60, 75, and 90° angular positions respectively. The Bollard pull is the force exerted by a ship's propeller and measured in Bollard trials when the ship is moored. Bollards, or bits, for example, are the posts used for mooring the ships and are well known in the naval architecture art.

Figure 18:
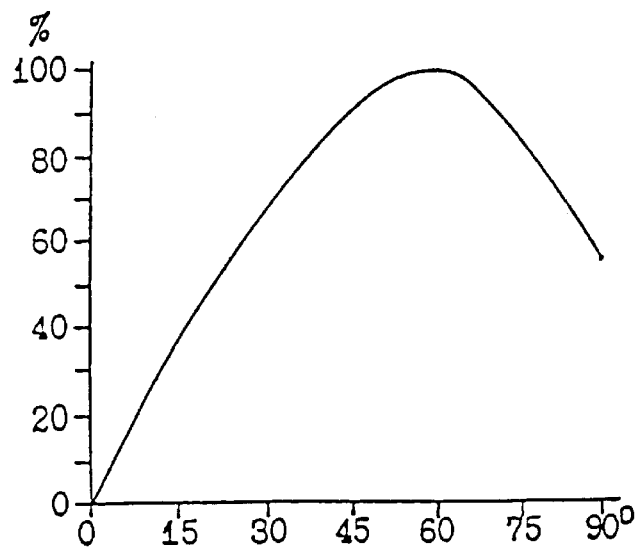
FIG. 18 is a diagram of the pull of the propeller of the invention expressed in percent versus the direction of the blade motion in respect to the midship section plane.

The data above are the results of an experiment plotted on the graph of the bollard pull percentage versus the direction of blade motion relative the midship section plane (FIG. 18).

A feature of the propeller of the invention is that it is suitable for use as an "active rudders" when the blades are rotated about their own axes.

Figure 19:
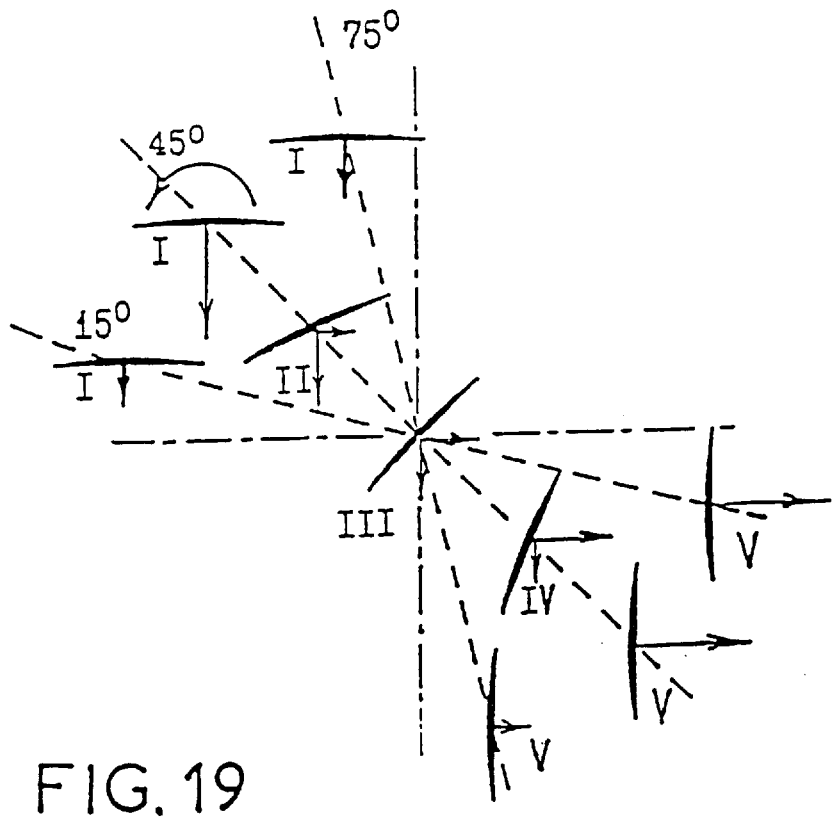
FIG. 19 is a diagrammatic view, by way of example, of blade positions in the water of the propeller according to the invention in various movements of a vessel.

Side components of propulsive forces and those displacing the ship's stern and/or bow undergo changes with different positions of a propeller blade (FIG. 19). But this is the case when the blades are rotated counterclockwise and when the blades of the right-side propeller on the bow and the left-side propeller on the stern are involved moving along dotted lines from position I to position V from the left-hand upper quadrant to the right-hand lower one.

When the blades are rotated counter-clockwise within 0° to 90° as viewed in the drawing, the ship's stern and/or bow will be displaced from right to left.

Figure 20:
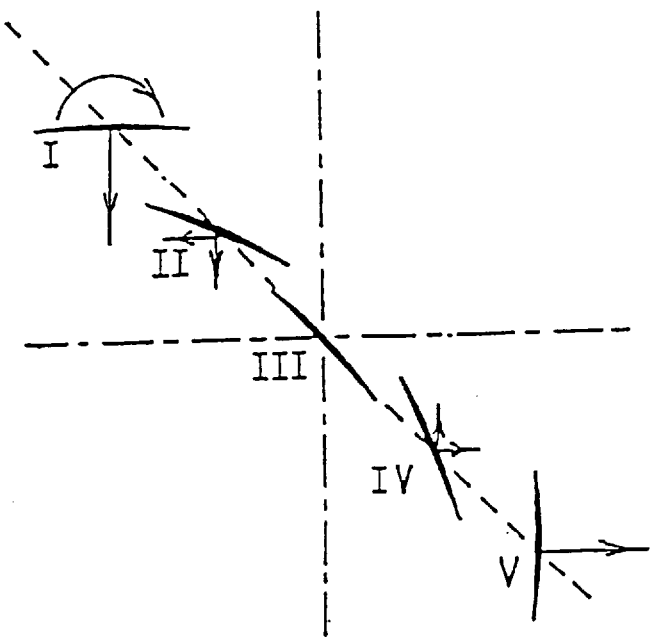
FIG. 20 is a diagrammatic view, by way of example, of blade rotations in the left-side displacement of a ship's stern and/or bow.

When the blades are rotated clockwise as viewed in FIG. 20, the propulsive force is initially reduced (position II) and vanish (position III), while at some positions of the blades (position IV) there appear a brake action and opposite side components.

Figure 17:
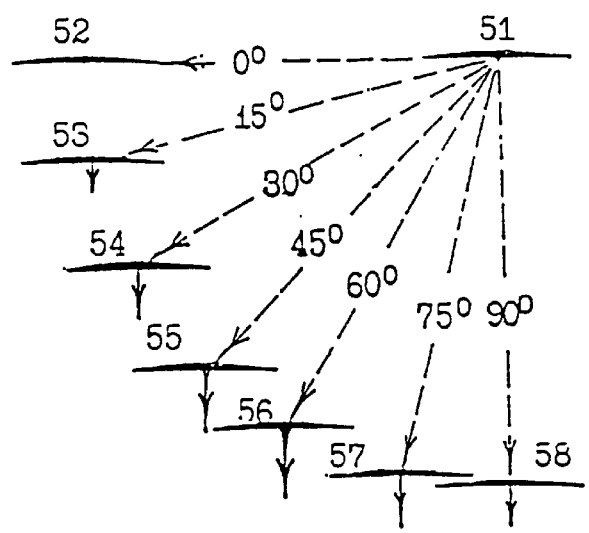
FIG. 17 is a diagrammatic view, by way of example, of the propeller blades according to the invention moving in the water in parallel to themselves at angles in the range of 0° to 90° to the midship section plane.

In operation, the propeller shaft is positioned at an angle to the longitudinal center plane as desired, e.g. 45°, while the propeller blades are ⅔ as to height submerged in water and positioned in preparation for startup in position 51 (FIG. 17).

As the propeller shaft begins to rotate toward position 55, it develops a propulsion force, since the water is accelerated in the direction of the solid arrow. The propeller blade, while moving in the water, sustains a reactive thrust and is slipping along the pressure front.

While revolving on the propeller shaft, the propeller blade is moving as described only when submerged in the water, but in going into and out of the water it is inclined, therefore practically in any case the blade partially pumps the water down during the first phase of a revolution and lifts it up at the second phase. But due to the fact that all the time another blade is moving in the water, there is no uplift of the water. Moreover, blade goes up in a way as if it slips out.

As the propeller rotates, with the propeller shaft positioned at an angle to the horizontal, e.g. +30° or −30° (FIG. 1), there are induced either upward or downward forces, while adjustment of the blades in either side in relation to the midship section plane to positions I through V (FIG. 19) results in a propulsion force which turns the ship (bow or stern) either way.

The greater number of propeller blades are mounted on a propeller shaft (FIGS. 3 and 4) or the longer is the band-shaped propeller (FIGS. 5 and 6), the greater is the propulsion force, other things being equal.

The propellers of the invention operate in a similar way on convertiplanes (FIGS. 13 and 14).

During acceleration in gliding and during traveling on the air-cushion support, the propeller shafts are positioned at an angle to the plane of symmetry of the convertiplane and the blades describe, as viewed from the front or rear positions, ellipses shown by dotted lines (FIG. 13).

Following acceleration and prior to take off, the propeller shafts of a twin-motor structure are approaching the position parallel to the plane of symmetry, while the propeller blades are approaching the transverse vertical plane. It is when the propeller shaft is positioned in parallel with the plane of symmetry and the motor rotational speed is abruptly increased (to reduce the tendency to accelerate as the propeller advance is diminishing) the twin-motor convertiplane takes off.

A four-engine convertiplane can also take off with two inner propellers operating in water (FIG. 13), while two other propellers have already been operating out of the water to sustain a reactive thrust of the air.

The band-shaped propellers operate in a way similar to that described above in the case of the blade propellers. The band-shaped propellers are different only in that there are no interstices between the blades and as the propeller shaft rotates as shown by the dotted arrow (FIG. 5) the water is accelerated in the direction shown by a solid arrow to thereby induce the ship's motion in the opposite direction.

The band-shaped propellers used on off-shore platforms (FIG. 7 and 8) permit them to perform any maneuvers (forward, astern, or any side motions and turning motion).

INDUSTRIAL APPLICABILITY

The propellers of the invention can be used on off-shore platforms, floating power plants as well as on displacement-type and high-speed (200 to 400 km/h) sea-going and river boats. They can also be used in outboard motors and on air-cushion vehicles and convertiplanes.

I claim:

1. A partially immersible propeller comprising a propeller shaft having propeller blades mounted thereon and disposed in an angular relationship to the longitudinal center plane of a ship for movement from 0° to 90° to said plane for varying the position relative to said plane, said propeller blades being constructed so that, being immersed in water, the driving face thereof is positioned substantially perpendicular to said plane.

2. The propeller of claim 1 wherein said propeller blades are mounted on said propeller shaft for adjustment within ±30° relative to a plane perpendicular to the propeller shaft axis.

3. The propeller of claim 1 wherein said propeller blades are mounted on said propeller shaft for rotation about their respective axes and said propeller shaft is positionable to ±30° relative to an axis perpendicular to the propeller shaft axis.

4. The propeller of claim 1 wherein said propeller shaft is movable relative to the midship section plane at an angle of from 0° to 30°.

5. The propeller of claim 1 wherein said propeller shaft is rotatable about an axis which is perpendicular to the midship section plane.

6. A partially immersible propeller for a ship, comprising a propeller shaft disposed in an angular relationship with respect to the longitudinal center plane of the ship, at least two propeller blades mounted on said propeller shaft, means for moving said propeller shaft from 0° to 90° relative to either side of said center plane for varying the positions of said propeller blades relative to said center plane, said propeller blades being structured such that, when immersed in water, the driving force thereof is positioned substantially perpendicular to said center plane.

7. A partially immersible propeller for a ship, comprising a propeller shaft disposed at an angular relationship to the longitudinal center plane of the ship, at least two propeller blades mounted on said propeller shaft, means for moving said propeller shaft from 0° to 90° relative to either side of said center plane for varying the positions of said propeller blades relative thereto, said propeller blades being structured such that, when immersed in water, the driving force thereof is positioned substantially perpendicular to said center plane, and means for adjustment of the positions of said propeller blades to within ±30° relative to the perpendicular to the propeller shaft axis.

* * * * *